United States Patent
Tedeschi et al.

(10) Patent No.: US 12,161,058 B2
(45) Date of Patent: Dec. 10, 2024

(54) ARRANGEMENT OF POSITIONING MECHANISMS OF SEED DRILLS FOR TRANSPORT

(71) Applicant: Tedeschi Maquinarias S.A., Provincia de Santa Fe (AR)

(72) Inventors: Hugo Mario Tedeschi, Provincia de Santa Fe (AR); Oscar Guillermo Ponzio, Provincia de Santa Fe (AR); Norberto Agustin Tedeschi, Provincia de Santa Fe (AR)

(73) Assignee: Tedeschi Maquinarias S.A., San Martin (AR)

( * ) Notice: Subject to any disclaimer, the term of this patent is extended or adjusted under 35 U.S.C. 154(b) by 773 days.

(21) Appl. No.: 17/404,008

(22) Filed: Aug. 17, 2021

(65) Prior Publication Data

US 2022/0117145 A1    Apr. 21, 2022

(51) Int. Cl.
*A01B 73/06* (2006.01)
*A01C 7/08* (2006.01)
*A01C 7/20* (2006.01)

(52) U.S. Cl.
CPC ............ *A01B 73/067* (2013.01); *A01C 7/082* (2013.01); *A01C 7/201* (2013.01); *A01C 7/208* (2013.01)

(58) Field of Classification Search
CPC ....... A01B 73/067; A01B 73/06; A01B 73/02; A01B 73/00; A01C 7/082; A01C 7/201; A01C 7/208; A01C 7/081; A01C 7/08; A01C 7/00; A01C 7/20

See application file for complete search history.

(56) References Cited

U.S. PATENT DOCUMENTS

2015/0327428 A1* 11/2015 Landon ................ A01D 78/001
56/228

* cited by examiner

*Primary Examiner* — Christopher J. Novosad
(74) *Attorney, Agent, or Firm* — Defillo & Associates, Inc.; Evelyn A. Defillo

(57) ABSTRACT

Arrangement for positioning mechanisms of seed drill machines for transport, preferably of the "auto trailer" type, including at least one toolholder bar, with their respective sowing units, divided into a central piece coupled to the structure of the chassis, and two side pieces, one at each side of the central piece, which pivot in a horizontal plane for being folded, with the corresponding sowing units, from the working position of the seed drill to the transport position parallel to the longitudinal axis of the chassis. The toolholder bar is mounted on a cart attached by guide plates to a lift tower and moves both up and down along lift tower by triggering hydraulic cylinders. The lift tower is coupled to mobility device, with the toolholder bars and sowing units, from the working position to the transport position of the seed drill, and vice versa. The transport position is defined in a section of the drawbar next to the attachment end of a transportation tractor of the machine.

3 Claims, 3 Drawing Sheets

2

ARRANGEMENT OF POSITIONING MECHANISMS OF SEED DRILLS FOR TRANSPORT

FIELD OF THE INVENTION

This invention refers to an arrangement of positioning mechanisms of seed drills for transport, preferably for "auto trailer" type drills. More specifically, the invention consists of improvement of the mechanisms intended to transfer the toolholders from the seeding position to transport position and vice versa, for the purpose of reducing the length of the machine in transport position, as well as for balancing the weight of the machine with respect to the attachment point of the drawbar to the transport tractor.

STATE OF THE ART

As prior art in the matter, it is worth mentioning that, currently, there are, basically, two types of "auto trailer" seed drills. In the first kind of said auto trailer seed drills, the toolholder bar is built on a cart coupled by means of guide plates to a lift tower along which the bar moves vertically, both up and down, by triggering a hydraulic cylinder and, by means of another hydraulic cylinder, the rotation of the toolholder bar is activated with respect to a vertical axis to place it either in working position or in transport position, as the case may be. In the second type of said auto trailer seed drills, the toolholder bar is divided into a central piece that is coupled to the structure of the chassis, and two side pieces, one at each side of the central piece, that can pivot in a horizontal plane for the purpose of placing itself parallel to the longitudinal axis of the chassis, and thus, go from working position to transport position of the seed drill.

The problem with the first of these traditional seed drills is that machines of a large working width, the toolholder bars take up a great length during transport, and this causes dangerous conditions of transport in routes and roads. Regarding the second, although the transport length is shorter, it generates a great weight at the attachment point of the drawbar of towing tractors, causing a high risk of breakage. This fact is minimized in some models by adding several support wheels in the area close to said attachment point, but this carries other problems, such as high costs, difficulties to keep the right trajectory through routes and roads, generating risks of accidents.

In view of this situation, which undoubtedly constitutes a serious problem that must be solved, some improvements, which are the subject matter of this invention, have been developed. Said improvements shad be demonstrated clearly by describing them with reference to the Figures that illustrate said improvements.

SUMMARY OF THE INVENTION

For the purpose of solving the aforementioned problems related to traditional auto trailer seed drills, some structural innovative features, and, consequently, some functional improvements, have been developed. Through such improvements, a considerable reduction in the length of transport has been achieved, as well as a reduction of risk of accidents in routes and roads of public use, thus, said improvements comply with the requirements set forth by the regulations in force established by traffic safety organisms; and the reduction of the weight of the machine at the attachment point of the drawbar reduces the risks of breakage of the drawbar of tractors used for that purpose. A translation mechanism has been incorporated to the seed drill, which is the subject matter of the invention herein, for the purpose of shifting the gravitational center in the direction opposite to the aforementioned attachment point in such a way as to minimize the weight over this attachment point, with values totally compatible with the safety indexes of every drawbar of tractors with output that are in accordance with the range of the great seed drills in the market.

Thus, the purpose of this invention is to provide an arrangement of positioning mechanisms of seed drills for transport, preferably for "auto trailer" type drills, which include at least one toolholder bar, with their respective sowing units, divided into one central piece that is coupled to the structure of the chassis, and two side pieces, one at each side of the central piece, and these side pieces can pivot in a horizontal plane for the purpose of allowing folding, with the corresponding sowing units, from the working position of the seed drill to the transport position parallel to the longitudinal axis of the chassis, and vice versa. The toolholder bar is mounted on a cart coupled to a lift tower by guide plates and can move up and down along said tower by activating hydraulic cylinders. The lift tower is coupled to the displacement means of said lift, with the toolholder bar and the sowing units being able to go from the working position to the transport position of the seed drill and vice versa. The transport position is defined in a section of the drawbar next to the end of the attachment point of a transport tractor of the seed drill, and it concurs with the gravitational center of the seed drill as a whole and the balance point of its respective weight with respect to the axis of the chassis.

BRIEF DESCRIPTION OF THE FIGURES

For the purpose of clarity and a better comprehension of the invention herein, a machine corresponding to the prior art is illustrated, as well as an example of the preferred method of implementation of the machine, which is the subject matter of the invention herein, where.

DETAILED DESCRIPTION OF THE INVENTION

Figure 1:
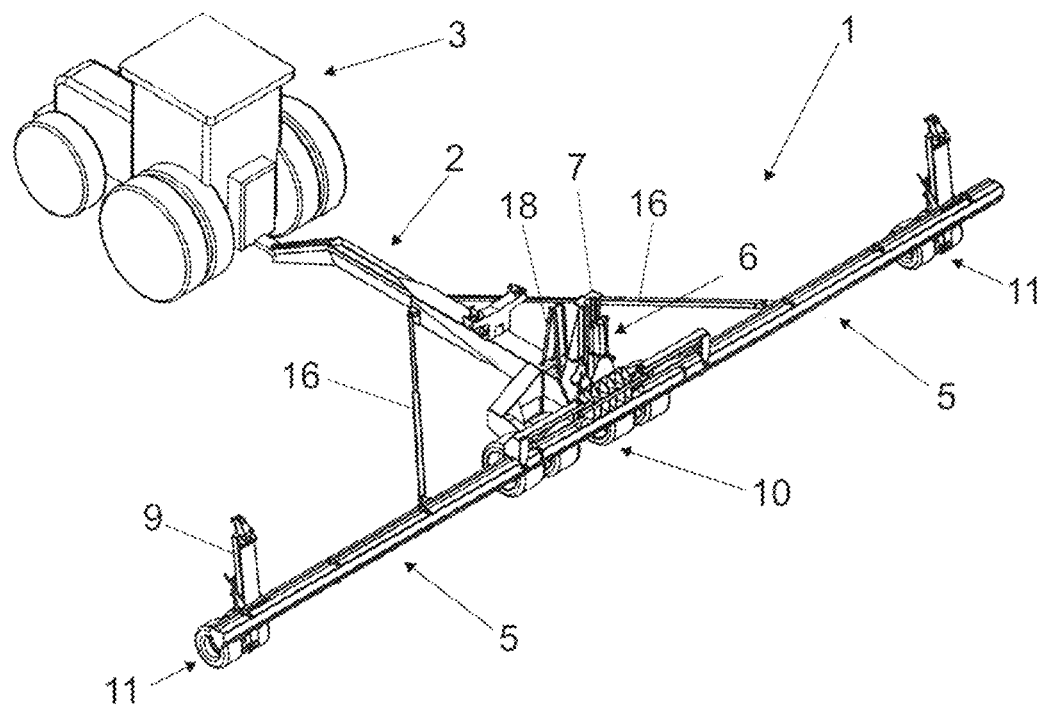
FIG. 1 is a rear perspective view of the seed drill in working position and coupled to a tractor generically represented, with its toolholder bars and without the sowing units, for the sake of more clarity of the Figure.
Figure 2:
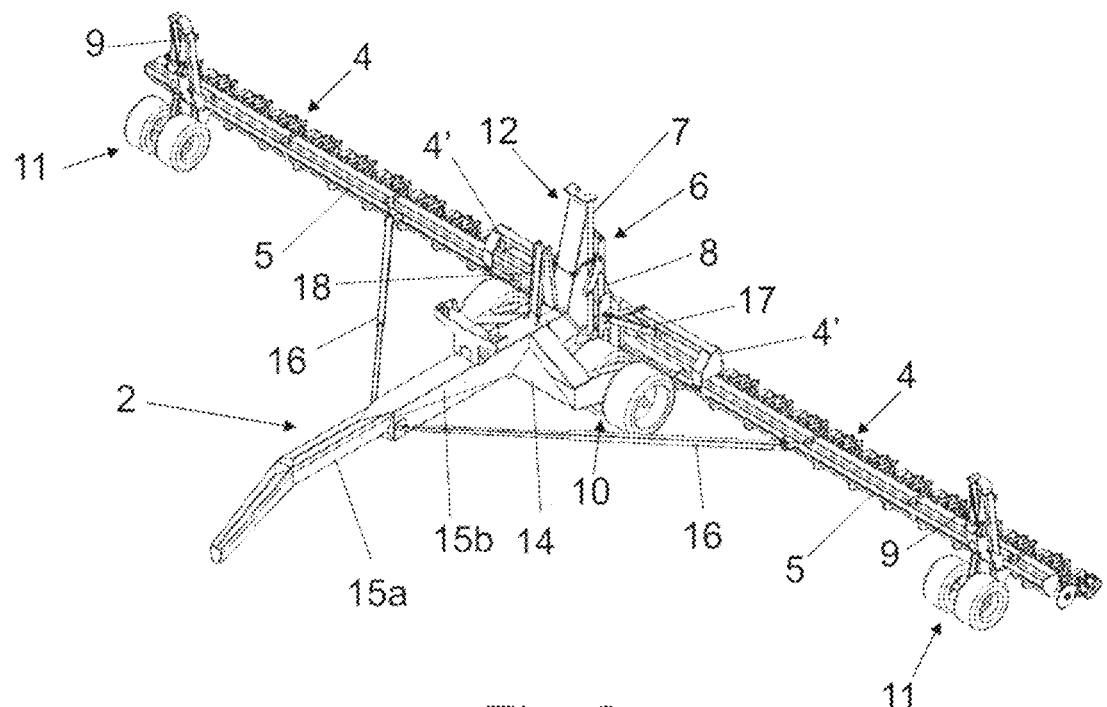
FIG. 2 is a front perspective view of the seed drill in working position, without the tractor and with sowing units in the respective toolholder bars.
Figure 5:
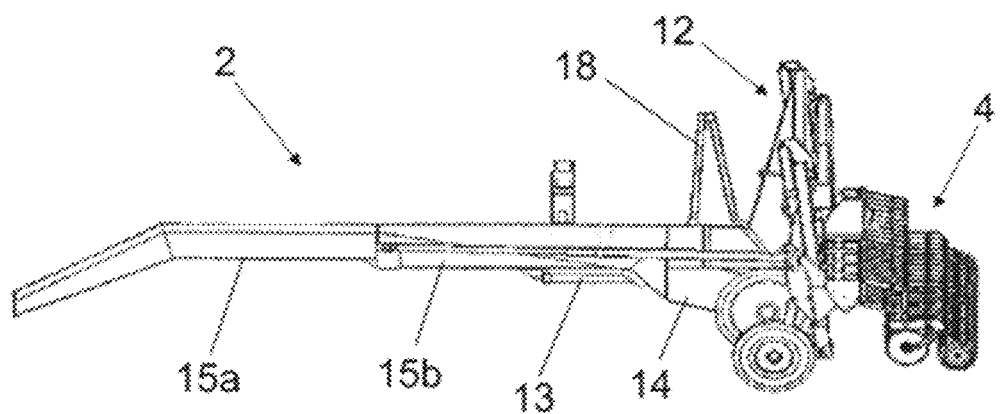
FIG. 5 is a side view of the seed drill of how the toolholder bars would be located in the transport position.

FIGS. 1 and 2 show the seed drill in working position coupled from the drawbar 2 to a tractor 3 (not illustrated in FIG. 2), and they show that sowing units 4 (not illustrated in FIG. 1) are supported by their respective toolholder bars 5 mounted, from one of its ends, over a cart 6, which moves vertically inside the guide plates 7, and the movement of the cart 6 is triggered by a hydraulic cylinder 8, coupled directly to said cart 6, and hydraulic cylinders 9 placed in theft corresponding supports fixed on the opposite ends of the toolholder bars 5 where the transport wheels 10 of the machine can be found. The wheels 11, coupled on the opposite ends of the toolholder bars 5, have the function of copying the irregularities of the field to avow all sowing units 4 to be on the optimal height position during seeding. Besides, said wheels 10 support the toolholder bars 5 when the seed drill goes to the transport position. The guide plates 7 are operationally attached to a movable tower 12, which can move horizontally by means of the hydraulic cylinder 13 placed, as shown in FIG. 5, under the chassis 14.

The drawbar 2 is defined by a bar 15*a* partially placed in a tubular body 15*b* that is projected as an integral part of the chassis 14, and said bar 15*a* and said body 15*b* form a telescopic coupling in such a way as to allow the movement of the chassis 14 from the working position of the seed drill to the transport position and vice versa. Between said chassis 14 projection 15 and each toolholder bar 5, a respective telescopic tightener is extended 16, at the same time, between the cart 6 and the supports 4' of each toolholder bar 5, respective hydraulic cylinders 17 are extended for the purpose of simultaneously folding both toolholder bars 5 from the working position to the transport position and vice versa. Through a piece 18 defined by two arms articulately linked from theft respective ends, the chassis 14 terrains coupled to the rear end of the arm 15*a* of the bar 2 during the movements that go from the working to the transport position of the seed drill and vice versa.

Figure 3:
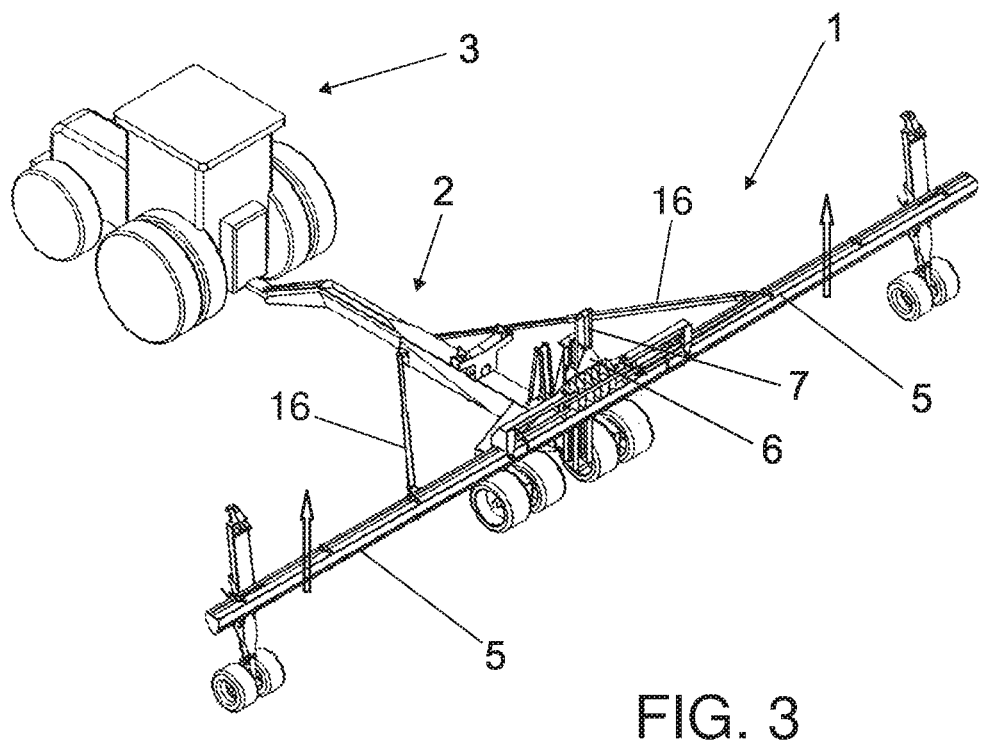
FIG. 3 is another rear perspective view of the seed drill, where the toolholder bars are shown lifting vertically to the transport position.

FIG. 3 shows the toolholder bars 5 with the sowing units 4 being vertically lifted by means of the hydraulic cylinders 8 and 9, from the working position to the folding position until they get to the transport position of the seed drill.

Figure 4:
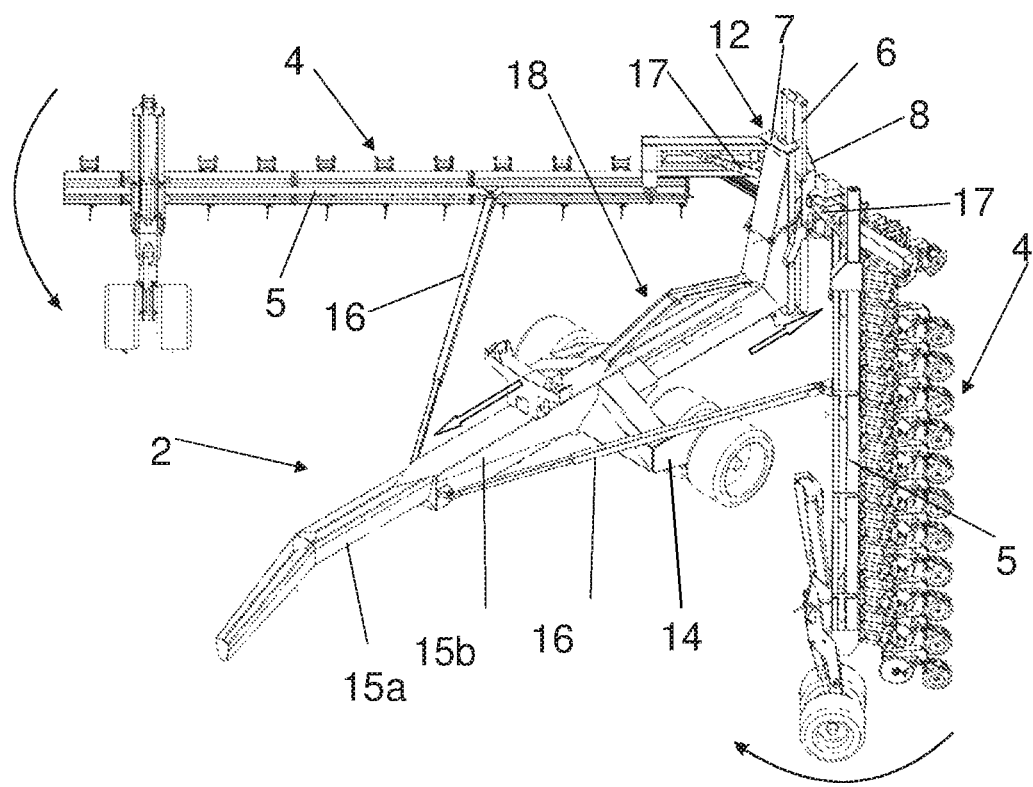
FIG. 4 is a front perspective view of the seed drill with its toolholder bars lifted, as illustrated in FIG. 3, and now, shifting form the working position to the transport position.
Figure 6:
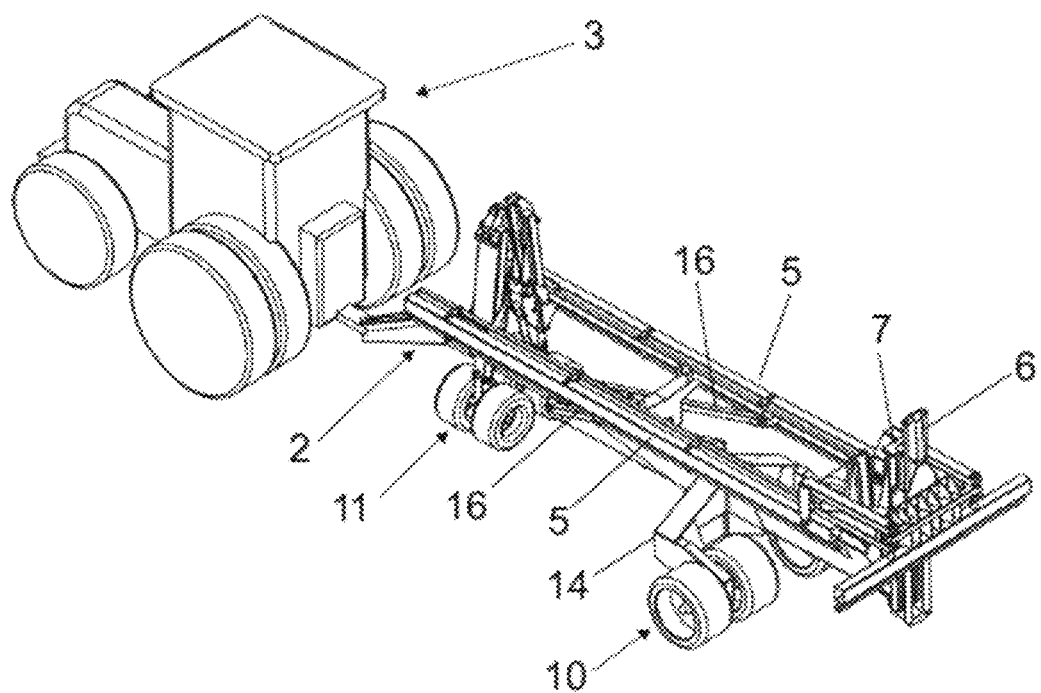
FIG. 6 is a rear perspective view of the seed drill in transport position and coupled to a tractor, with no sowing units, for the purpose of clarity of the Figure.

FIG. 4 shows the toolholder bars 5 with their corresponding sowing units 4 in an intermediate folding point, by the triggering of the telescopic tighteners 16 and the hydraulic cylinders 17, from the working position to the transport position of the seed drill. FIG. 6 shows how the seed drill is attached from the drawbar 2 to the tractor 3 for transport while occupying a minimum width in the road, rout, etc., through which it moves. In this position, we can say that with the toolholder bars 5 completely folded parallel to the drawbar 2 and pushed forward, the weight of the seed drill is balanced over the transport wheels 10, thus, achieving the proposed objective with the aforementioned noteworthy advantages.

The following is a brief description of the operational sequence to make the seed drill go from the working position to the transport position;

a) First, the hydraulic cylinders are simultaneously triggered 8 and 9 to lift the toolholder bars 5 with all the sowing units 4, being the wheels 11 placed on the ground.

b) Subsequently, the hydraulic cylinders are simultaneously triggered 17 in such a way that the toolholder bars 5 start to close until being placed parallel to the longitudinal axis of the drawbar 2 of the seed drill, while the tower 12 moves backwards, meaning that it moves to the opposite end of the drawbar 2 where the tractor 3 is attached. Precisely, the movement of the tower 12 makes the gravitational center of the seed drill as a whole to be placed on the transport wheels 10, which makes all mechanisms to be balanced and the weight over the end of the drawbar 2, which is coupled over the drawbar of the tractor, to be minimal.

Having described and determined the nature of the invention herein and the way in which said invention shall be implemented, it is hereby requested that the following be claimed as an exclusive property and right:

1. A positioning mechanism an for an auto trailer seed drill machine comprising;
    at least one toolholder bar, said at least one toolholder bar having sowing units, divided into a central piece adapted to be coupled to a chassis of an agricultural machine, and two side pieces located at each side of the central piece which can pivot in a horizontal plane for being folded, with the corresponding sowing units, from a working position of the auto trailer seed drill machine to a transport position parallel to a longitudinal axis of the chassis, and vice versa;
    wherein the at least one toolholder bar is mounted on a cart attached by guide plates to a lift tower and moves up and down along said lift tower by triggering hydraulic cylinders, and
    wherein the lift tower is coupled to a mobility device, with the at least one toolholder bar and sowing units, from the working position to the transport position of the auto trailer seed drill machine, and vice versa,
    wherein the transport position defined in a section of a drawbar next to an attachment end of a tractor of transport of the auto trailer seed drill machine, and said transport position coinciding with the gravitational center of the auto trailer seed drill machine as a whole and with a balance point of weight in respect of a chassis axis.

2. The positioning mechanism in accordance with claim 1, wherein the gravitational center of the auto trailer seed drill machine in the transport position is defined over a location of transport wheels.

3. The positioning of mechanism in accordance with claim 1, wherein said mobility device of the lift tower is a hydraulic cylinder that expands between the chassis and the drawbar.

* * * * *